(12) United States Patent
Malmgren et al.

(10) Patent No.: US 6,807,154 B1
(45) Date of Patent: Oct. 19, 2004

(54) LINK AND RADIO CELL ADAPTATION IN TDD SYSTEMS

(75) Inventors: Göran Malmgren, Hägersten (SE); Jamshid Khun-Jush, Nürnberg (DE); Hui Li, Nürnberg (DE); Uwe Dettmar, Oberuriel (DE); Peter Schramm, Erlangen (DE); Jörn Thielecke, Erlangen (DE); Udo Wachsmann, Schwabach (DE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/415,705

(22) Filed: Oct. 11, 1999

(30) Foreign Application Priority Data

Oct. 12, 1998 (EP) .............................................. 98119213

(51) Int. Cl.[7] .............................. H04B 7/212; H04J 3/14; H04J 3/16
(52) U.S. Cl. ........................ 370/252; 370/347; 370/468
(58) Field of Search ................................. 370/252, 276, 370/277, 278, 280, 282, 345, 347, 328, 329, 336, 337, 468, 281, 294, 312, 314, 442, 465, 498, 545

(56) References Cited

U.S. PATENT DOCUMENTS

| | | | | |
|---|---|---|---|---|
| 5,329,574 A | | 7/1994 | Nielson et al. ................ 379/58 |
| 5,546,411 A | * | 8/1996 | Leitch et al. ................ 714/708 |
| 5,991,282 A | * | 11/1999 | Langlet et al. ............... 370/332 |
| 6,028,851 A | * | 2/2000 | Persson et al. .............. 370/329 |
| 6,078,568 A | * | 6/2000 | Wright et al. ................ 370/312 |
| 6,289,217 B1 | * | 9/2001 | Hamalainen et al. ....... 455/425 |
| 6,356,555 B1 | * | 3/2002 | Rakib et al. ................. 370/441 |
| 6,407,993 B1 | * | 6/2002 | Moulsley ..................... 370/347 |
| 6,442,146 B1 | * | 8/2002 | Onodera et al. ............. 370/321 |
| 6,466,568 B1 | * | 10/2002 | Raith et al. .................. 370/347 |
| 6,529,730 B1 | * | 3/2003 | Komaili et al. ........... 455/452.2 |

FOREIGN PATENT DOCUMENTS

| | | |
|---|---|---|
| WO | WO 9826523 A2 | 6/1998 |
| WO | WO 9832265 A1 | 7/1998 |
| WO | WO 9907168 A1 | 2/1999 |

OTHER PUBLICATIONS

Göransson, P., International Search Report, International App. No. PCT/SE99/01774, Mar. 28, 2000, pp. 1–4.

* cited by examiner

*Primary Examiner*—Hassan Kizou
*Assistant Examiner*—Timothy Lee

(57) ABSTRACT

A TDMA/TDD link adaptation method determines radio link quality at a base station. The radio link quality is used to update and broadcast a physical layer parameter indicator (10–16) from the base station on a broadcast control channel having a common physical layer parameter indicator for all uplink and downlink channels.

16 Claims, 1 Drawing Sheet

LINK AND RADIO CELL ADAPTATION IN TDD SYSTEMS

TECHNICAL FIELD

The present invention relates generally to TDMA/TDD (Time Division Multiple Access / Time Division Duplex) radio communication systems, and especially to adaptation of the systems to prevailing radio conditions.

BACKGROUND

ETSI BRAN (Broadband Radio Access Network) is developing a short-range high data rate system, HIPERLAN Type 2 (also called H/2), mainly for indoor operation. Some outdoor scenarios are also considered (campus areas, downtown city areas). The target areas are offices, conference halls, exhibition fairs, airports and home environments. The spectrum is unlicensed and thus several "operators" may use the same spectrum. The interference environment may change during operation due to for example new operators in the vicinity of the own network and it is then very difficult to predict what type of interference the system shall be able to handle. The large difference in radio propagation, i.e. LOS (Line Of Sight) and NLOS (No Line Of Sight), and interference environments in which the system be must be able to operate, puts strong requirements on the system that it is able to adapt to its current situation. In this type of systems, one radio cell might be exposed to larger interference than other radio cells. Just an adaptation per radio cell to handle this situation is referred to as "radio cell adaptation". Furthermore, the mobile terminals (MTs) associated with a certain base station (BS) may have different reception qualities in their uplink and downlink respectively. Hence, in this case each MT might want to use different transmission parameters, e.g. code rate (protection level) and modulation alphabet, to be able to adjust its reception quality in the uplink and downlink. This adaptation could be performed per MT or per its individual connections. In the latter case differing traffic and QoS (Quality of Service) parameters have to be considered. For example, one MT could have a connection carrying video using a powerful FEC (Forward Error Correction) code, whereas a connection for file transfer uses a less strong FEC but with ARQ (Automatic ReQuest for retransmission) capabilities.

Typical reception quality measures are:

retransmission rate (PER, Packet Error Rate), delay spread (time dispersion), received signal strength (RSSI), Signal-to-Interference Ratio (SIR)

Bit Error Rate (BER)

Combinations of these performance measures and others are also possible.

Usually link adaptation is divided into two groups: net rate adaptation and gross rate adaptation.

Net rate adaptation means that the incoming data rate is adjusted to fit into the assigned capacity so that the system can handle a certain link quality, i.e. the user has a fixed assigned capacity over the air, and if the radio quality is poor the incoming data rate is reduced and a more robust transmission mode is used. In case of a good connection a higher incoming data rate can be used.

In gross rate adaptation the incoming data rate is "fixed", i.e. the radio system does not change its incoming traffic due to the radio conditions. Instead the radio system tries to sustain the incoming data rate and to counter the variations in link quality by assigning correspondingly varying capacity over the air interface. Thus, two MT with the same incoming data rate could have been assigned different capacity over the air interface based on their individual connection reception qualities. An extra function might be needed in this case to guarantee fair utilisation of the total available capacity.

Combination of net and gross rate adaptation is of course also possible.

The present situation with regard to adaptation to varying radio conditions in different radio communication standards may be summarised as follows:

HIPERLAN/2: No proposal exists on a protocol that handles the ability to make radio cell adaptation and/or link (per MT or per connection) adaptations. Still, the proposals on the physical layer allow different code rates and modulation alphabets (MPSK and MQAM signal constellations).

GPRS: The system applies net rate link adaptation (selects channel coding) per mobile terminal, see [1]. For downlink traffic the MT request channel coding via ARQ-ACK/NACK messages through the uplink. The BS is using stolen bits (embedded in the burst structure of GSM) to set the channel code for the downlink. Hence, the MT first decodes these bits to obtain information on which channel decoding it shall use for the rest of the burst. In case unacknowledged mode is applied, the MT sends measurements reports to the BS including an estimation of the BER. This information can then be used by the BS to select channel coding for the downlink bursts.

For the uplink traffic the BS commands the MT to use a certain channel coding. This information is transferred to the MT piggybacked on downlink dedicated control channels, e.g. piggybacked on ARQ-ACK/NACK messages.

A drawback is that in GRPS it is not possible to change channel coding during retransmission phase.

EDGE, EGPRS: These two systems apply net rate link adaptation (select channel coding and modulation alphabet) per mobile terminal. No protocol exists yet. However, the structure and protocol is based on the GPRS structure and a similar protocol will be utilised. Extensive simulation studies have been performed on the system throughput and can be found in [2].

The problem with changing channel coding during retransmissions is solved by doing re-segmentation. However, the frame structure used in these systems is not suited for a TDD system.

DVB, DAB: Digital Video/Audio Broadcasting uses different code rates and modulation alphabets to be able to extend their coverage regions and to enable the possibility for an broadcaster to select suitable parameters so that both data and the ordinary program can be sent on the allocated bandwidth, see [3]. In the pure broadcast scenario no uplink signalling exists. Recently, an ACTS program called MEMO has been developed for individual services; the ordinary GSM network is used for the uplink signalling. In this case downlink link adaptation is possible. Still no protocol that enables this signalling exists.

IEEE 802.11: A new physical layer standard is now developed for 5 GHz operation, see [4]. The standard is not fixed yet and the system will apply some sort of link adaptation. The proposed solution is assuming that the physical layer is totally independent from the IEEE 802.11 MAC layer. To enable this a convergence layer, called PHY PLCP (Physical Layer Convergence Protocol), is put in between, where primitives are used through SAPs (Service Access Point) to instruct the physical layer to react.

The selected link parameters are performed by the sending unit, i.e. in the downlink the BS selects the parameters and in the uplink the MT selects the parameters. Both BS and MT are making measurements before selecting PHY (PHYsical layer) parameters, e.g. RSSI measurements.

The access scheme is based on CSMA/CA (Carrier Sense Multiple Access with Collision Avoidance). This implies that one MAC frame (in IEEE 802.11 this is equal to a MPDU (MAC Protocol Data Unit)) is transmitted between two peer entities only, i.e. the MAC frame is only between a BS (centrally controlled system) and one MT, or the MAC frame is only between two MTs (Ad-hoc system). The duration of the MAC frame depends on the selected PHY parameter In case of a more robust PHY mode, the length of the PHY frame becomes longer due to higher FEC protection.

This is a gross rate adaptation approach which is not able to consider QoS and fairness between users, i.e. since the transmitting unit is selecting the PHY parameters (used capacity), a user may select a parameter corresponding to a robust PHY mode resulting in larger capacity utilisation even though it is not necessary.

In the current version of the IEEE 802.11 proposal for 5 GHz, measurements needed for the selection of PHY parameters has to be performed by both the BS and the MT.

SUMMARY

An object of the present invention is to provide a spectrum efficient radio link adaptation method and frame structure for a TDMA/TDD radio communication system.

This object is achieved in accordance with the attached claims.

Briefly, the present invention uses the BCCH (Broadcast Control CHannel) to adapt the radio cell to prevailing radio conditions. This provides a very efficient method, since a common physical layer parameter indicator may be used for all radio links. An efficient and more flexible embodiment uses a common physical layer parameter indicator to adapt the uplinks of the radio cell, while the downlinks are individually adapted using physical layer parameter indicators in the ACH (Announcement & assignment CHannel). It is also possible to let the BCCH indicate the physical layer parameters to be used for decoding of the ACH.

BRIEF DESCRIPTION OF THE DRAWINGS

The invention, together with further objects and advantages thereof, may best be understood by making reference to the following description taken together with the accompanying drawings, in which.

DETAILED DESCRIPTION

Figure 1:
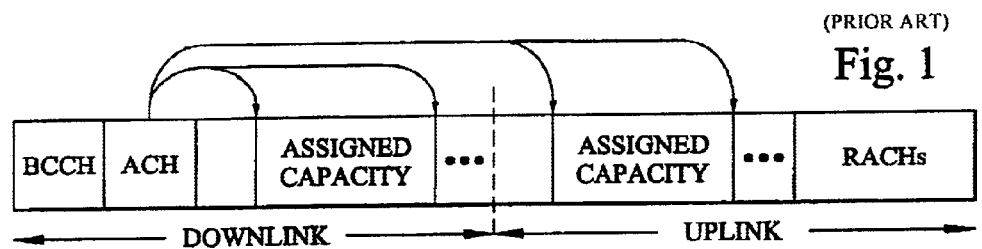
FIG. 1 is a diagram illustrating a basic frame structure of a TDMA/TDD radio communication system.

The system in accordance with the present invention uses a TDMA/TDD (Time Division Multiple Access/Time Division Duplex) MAC (Media Access Control) frame structure (e.g. H/2 and IEEE 802.11). An example of such a frame structure is depicted in FIG. 1. A centrally controlled MAC scheme is assumed, i.e. the BS assigns capacity to the MTs. The assignments could be different between two MAC frames, i.e. one user might be assigned capacity in one MAC frame and in the next MAC frame this user will not be assigned any capacity. In case of ad-hoc operation, one MT could act as the central controller. In FIG. 1 assigned capacity for one connection (downlink +uplink) has been indicated, while the dots represent assigned capacity for other connections.

The MAC frame starts with a Broadcast Control CHannel (BCCH) which contains information that is transmitted over the entire area that a BS covers (radio cell). The assignment of different MTs capacity is transmitted in the ACH (Announcement & assignment CHannel, sometimes referred to as resource grant channel or FCH (Frame Control cHannel)). The whole ACH is not necessarily transmitted over the whole radio cell. In case multi beam antennas are applied, the information that is only concerned to a certain beam is then only transmitted over its corresponding coverage area. Pointers may be applied in the ACH so that a MT that is assigned capacity knows exactly when in the frame it is expected to receive and send data, i.e. in the "Assigned Capacity" regions. Random Access CHannels (RACH) might be located at the end of the frame. A MT may request for capacity in its assigned uplink capacity region or via one random access channel.

The exemplary embodiments of frame structures in accordance with the present invention described below are applicable for both gross and net rate link/radio cell adaptation.

Figure 2:
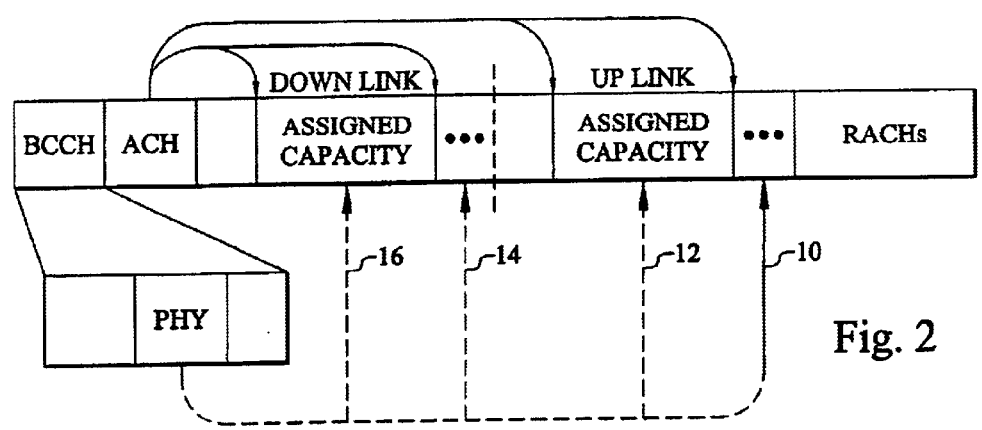
FIG. 2 is a diagram illustrating an exemplary embodiment of a frame structure in accordance with the present invention suitable for a TDMA/TDD radio communication system.

FIG. 2 is a diagram illustrating an exemplary embodiment of a frame structure in accordance with the present invention suitable for a TDMA/TDD radio communication system with centrally controlled assignment of capacity. In this embodiment radio cell adaptation parameters are only transmitted in the BCCH (or some other permanent or temporary "control channel" for broadcasting messages). This embodiment may assume that the BS has all information necessary to make a decision on a single PHY parameter setting (e.g. code rate, modulation alphabet, time slots/frame) without any interaction (no explicit uplink signalling) with the MTs). Statistics of the PER, delay spread, received signal strength, SIR and BER could for example be used in the selection procedure. The measurements could be performed on the traffic and control data PDUs (Protocol Data Units) that are received at the BS. The single PHY parameter setting (which is dynamically varying) could be used for some or all connections, as indicated by the dashed arrows 10, 12, 14 and 16 in FIG. 2.

One nice feature of this embodiment is that all PDUs of the same type will have the same size and the assignment of capacity resources becomes easier.

Since a common indicator is used for all links, it is appreciated that the embodiment in FIG. 1 implements radio cell adaptation.

Radio cell adaptation could also be performed on uplink only or downlink only. Furthermore, the broadcast message including the common PHY parameter indicator may also be broadcast in other "channels"than the BCCH, for example a dedicated PHY parameter channel.

Figure 3:
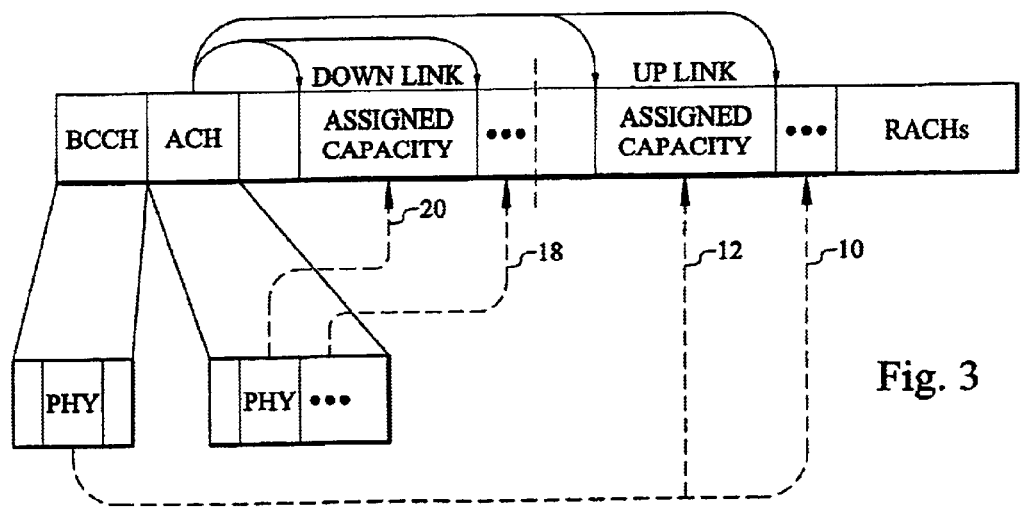
FIG. 3 is a diagram illustrating another exemplary embodiment of a frame structure in accordance with the present invention suitable for a TDMA/TDD radio communication system.

FIG. 3 is a diagram illustrating another exemplary embodiment of a frame structure in accordance with the present invention suitable for a TDMA/TDD radio communication system. In this embodiment a single PHY mode is used in the uplink for all MTs, as indicated by dashed arrows 10, 12. This is an efficient signalling mechanism in case all MT will have similar reception quality in the uplink. This could for example be accomplished if power control is applied in the uplink, i.e. the BS controls (decides) the MTs power level. However, in this embodiment the downlink is individually assigned via the ACH, as indicated by dashed arrows 18, 20 in FIG. 3.

The embodiment of FIG. 3 implements a combination of radio cell and individual link adaptation, since all uplinks are adapted in the same way as in the embodiment of FIG. 1, while downlinks are individually adapted.

A combination of the embodiments of FIGS. 2 and 3 is also possible. In such a combination the BCCH (or some other permanent or temporary "control channel" for broadcasting messages) is used to broadcast an indicator of the physical layer parameters that should be used to decode the ACH. The physical layer parameters may be individual or common for several channels, In some cases it is not necessary for the MTs to update the BS so frequently. This could be in situations when the radio channel and the interference environment are rather static and do not change. To use the ARQ PDU for this signalling will then create unnecessary overhead. To reduce the amount of signalling, a special signalling message (control channel), in which the information is transferred, could be used. This is a special control channel that is separated from other channels. An initial negotiation could take place between the MT and the BS on how often these messages should be transmitted. The BS could then, for example, assign uplink capacity to the MT on a regular basis. Such an embodiment creates a flexible solution. How the information is transmitted to the BS could also be negotiated, e.g. the approach to use the ARQ messages could of course be one way. Another approach is that all updates of the PHY mode are sent through the RACH. An alternative is to "piggyback" the information on one or several other messages, since this type of information may be represented by very few bits.

It will be understood by those skilled in the art that various modifications and changes may be made to the present invention without departure from the scope thereof, which is defined by the appended claims.

REFERENCES

[1] Digital cellular telecommunications system (Phase 2+); General Packet Radio Services (GPRS); Mobile Station (MS)—Base Station System (BSS) interface; Radio Link Control/ Medium Access Control (RLC/MAC) protocol (GSM 04.60 proposed version 1.1.0)

[2] Johansson C., de Verdier L., Khan F., "Performance of Different Scheduling Strategies in a Packet Radio System", VTC '98, 1998

[3] Lindberg, A., "Aspects on individual services in a dense cellular broadcasting network", MSc Thesis.

[4] Richard, Hitoshi, Masahiro, Doc: IEEE P802. 11-98/74-r4, July 1998

What is claimed is:

1. A TDMA/TDD media access control frame structure encoded in a computer-readable medium, said control frame structure comprising:

a broadcast message having a common dynamically updated physical layer parameter indicator for a plurality of uplink channels, said common dynamically updated physical layer parameter indicator for indicating a decision relating to a chosen transmission/reception mode for performing radio cell adaptation on said associated uplink channels;

wherein an indicator change forces a change of transmission/reception mode to said chosen transmission/reception mode for all of said plurality of uplink channels;

an announcement and assignment message having an individual dynamically updated physical layer parameter indicator for a particular downlink channel, said individual dynamically updated physical layer parameter indicator for indicating a decision relating to a chosen transmission/reception mode for performing individual link adaptation for a particular mobile station associated with said particular downlink channel; and wherein said broadcast message indicates a proper physical layer parameter that is to be used by a receiver to decode said individual dynamically updated physical layer parameter indicator included in the announcement and assignment message.

2. The control frame structure of claim 1, wherein said common dynamically updated physical layer parameter indicator is dynamically changed and included within said broadcast message for a plurality of mobile stations with established uplink channels.

3. The control frame structure of claim 1, wherein said individual dynamically updated physical layer parameter indicator is dynamically changed and included within said announcement and assignment message for an established downlink channel for a particular mobile station.

4. The control frame structure of claim 1, wherein said broadcast message belongs to a broadcast control channel.

5. The control frame structure of claim 1, including a separate control channel for occasional requests of physical layer parameter updates from mobile terminals.

6. A TDMA/TDD link adaptation method, including determining radio link quality at a central controller;

updating and broadcasting a broadcast message including a common physical layer parameter indicator for a plurality of channels from said central controller, said common physical layer parameter indicator for indicating a decision relating to said determined link quality for performing radio cell adaptation on an associated plurality of uplink channels;

wherein said common physical layer parameter indicator adapts transmission/reception mode for all of said plurality of uplink channels to said determined link quality;

updating and transmitting an announcement and assignment message including an individual physical layer parameter indicator for a particular downlink channel, said individual physical layer parameter indicator for indicating a decision relating to a determined link quality for performing individual link adaptation for a particular mobile station associated with said downlink channel; and wherein said broadcast message indicates a proper physical layer parameter that is to be used by a receiver to decode said individual physical layer parameter indicator included in the announcement and assignment message.

7. The method of claim 6, wherein said common physical layer parameter indicator is dynamically changed and included within said broadcast message for a plurality of mobile stations with established uplink channels.

8. The method of claim 6, wherein said individual physical layer parameter indicator is dynamically changed and included within said announcement and assignment message for an established downlink channel for a particular mobile station.

9. The method of claim 6, wherein said message belongs to a broadcast control channel.

10. The method of claim 6, including a separate control channel for occasional requests of physical layer parameter updates from mobile terminals.

11. The method of claim 6, wherein said central controller is a base station.

12. A TDMA/TDD radio communications system utilizing a TDMA/TDD media access control frame structure, said system comprising:

a central controller for transmitting a broadcast message having a common dynamically updated physical layer parameter indicator for a plurality of uplink channels, said common dynamically updated physical layer parameter indicator for indicating a decision relating to a chosen transmission/reception mode for performing radio cell adaptation on said associated uplink channels, whereby an indicator change forces a change of transmission/reception mode for all of said plurality of channels to said chosen transmission/reception mode;

wherein said central controller further handles an announcement and assignment message having an individual dynamically updated physical layer parameter indicator for a particular downlink channel, said individual dynamically updated physical layer parameter indicator for indicating a decision relating to a chosen transmission/reception mode for performing individual link adaptation for a particular mobile station associated with said particular downlink channel; and wherein said broadcast message indicates a proper physical layer parameter that is to be used by a receiver to decode said individual dynamically updated physical layer parameter indicator included in the announcement and assignment message.

13. The system of claim 12, wherein said common dynamically updated physical layer parameter indicator is dynamically changed and included within said broadcast message for a plurality of mobile stations with established uplink channels with said central controller.

14. The system of claim 12, wherein said individual dynamically updated physical layer parameter indicator is dynamically changed and included within said announcement and assignment message for a mobile station with an established downlink channel with said central controller.

15. The system of claim 12, wherein said broadcast message belongs to a broadcast control channel.

16. The system of claim 12, including a separate control channel for occasional requests of physical layer parameter updates from mobile terminals.

* * * * *

UNITED STATES PATENT AND TRADEMARK OFFICE
CERTIFICATE OF CORRECTION

PATENT NO. : 6,807,154 B1　　　　　　　　　　　　　　　　　　　　　　　　　　　Page 1 of 1
APPLICATION NO. : 09/415705
DATED : October 19, 2004
INVENTOR(S) : Malmgren et al.

It is certified that error appears in the above-identified patent and that said Letters Patent is hereby corrected as shown below:

On the Title Page, item (75), under "Inventors", in Column 1, Line 4, delete "Oberuriel" and insert -- Bornheim --, therefor.

In Column 1, Line 51, delete "(SIR)" and insert -- (SIR), --, therefor.

In Column 1, Line 52, delete "(BER) and insert -- (BER). --, therefor.

In Column 2, Line 33, delete "GRPS" and insert -- GPRS --, therefor.

In Column 5, Line 15, delete "channels," and insert -- channels. --, therefor.

Signed and Sealed this

Twenty-second Day of July, 2008

JON W. DUDAS
*Director of the United States Patent and Trademark Office*